US006212505B1

(12) United States Patent
Herbert

(10) Patent No.: US 6,212,505 B1
(45) Date of Patent: Apr. 3, 2001

(54) POSTAGE METER WITH REMOVABLE PRINT HEAD AND MEANS TO CHECK THAT PRINT HEAD IS AUTHORIZED

(75) Inventor: Raymond John Herbert, Leigh-on-Sea (GB)

(73) Assignee: Neopost Limited, Essex (GB)

( * ) Notice: Subject to any disclaimer, the term of this patent is extended or adjusted under 35 U.S.C. 154(b) by 0 days.

(21) Appl. No.: 09/070,024

(22) Filed: Apr. 30, 1998

(30) Foreign Application Priority Data

May 2, 1997 (GB) .................................................. 9709050

(51) Int. Cl.[7] ...................................................... G06F 17/00
(52) U.S. Cl. ............................................ 705/408; 705/410
(58) Field of Search ........................ 101/71, 91; 235/101; 705/401, 408, 410; 347/5, 7

(56) References Cited

U.S. PATENT DOCUMENTS

| | | | | |
|---|---|---|---|---|
| 3,869,986 | * | 3/1975 | Hubbard | 101/91 |
| 4,099,049 | * | 7/1978 | Lowe | 235/101 |
| 4,813,912 | * | 3/1989 | Chickneas et al. | 705/408 |
| 4,922,817 | * | 5/1990 | Holodnak | 101/91 |
| 5,093,560 | * | 3/1992 | Abellana | 235/101 |
| 5,188,025 | * | 2/1993 | Murphy et al. | 101/91 |
| 5,731,980 | * | 3/1998 | Dolan et al. | 705/410 |
| 5,901,644 | * | 5/1999 | Etheridge et al. | 101/71 |
| 6,089,687 | * | 7/2000 | Helterline | 347/7 |

FOREIGN PATENT DOCUMENTS 0 522 809 A2 * 1/1993 (EP) .

OTHER PUBLICATIONS

Shead, John; Ink jet printing comes of age; 12/1991; Pharmaceutical Manufacturing Review, v3, n4, p19(2); DialogWeb copy pp. 1–3.*

* cited by examiner

*Primary Examiner*—James P. Trammell
*Assistant Examiner*—Thomas A. Dixon
(74) *Attorney, Agent, or Firm*—Shoemaker and Mattare, Ltd.

(57) ABSTRACT

A postage meter includes a printing device, for example an inkjet print head cartridge having an integral ink supply, removable from the postage meter by a user of the postage meter whereby a cartridge with a depleted ink supply can be replaced with a cartridge having a full ink supply. The printing device includes means storing a unique identification of the printing device. The postage meter includes reading means to read the unique identification of a printing device installed in the postage meter to determine from whether the printing device is authorized for use in the postage meter. The postage meter is operable to print postage indicia only if the printing device is authorized for use in the postage meter.

11 Claims, 1 Drawing Sheet

POSTAGE METER WITH REMOVABLE PRINT HEAD AND MEANS TO CHECK THAT PRINT HEAD IS AUTHORIZED

BACKGROUND OF THE INVENTION

This invention relates to postage meters in which a print head utilized for printing postage indicia is removably mounted on the postage meter.

Postage meters include electronic means for carrying out accounting functions in respect of postage values which it is desired to apply to mail items by operation of a printer. The electronic means also carries out control functions for operation of the postage meter including operation of the printer. The accounting and control is carried out in a secure manner by housing the electronic means in a secure housing in order to protect the integrity of accounting data generated by the accounting means and to prevent fraudulent operation of the postage meter. It will be appreciated that it is also necessary, or at least desirable, to ensure that the printer cannot be operated to print postage indicia in respect of values for which proper accounting has not been effected. Accordingly the printer is usually housed, together with the electronic means, in the secure housing.

Previously postage meters have been provided with a drum printer or a thermal transfer printer for printing the postage indicia. With the drum printer, ink for printing the postage indicia is supplied by means of a replaceable absorbent roller containing liquid ink which rolls in contact with print dies on the print drum. With thermal transfer printers, ink is supplied as a layer on a replaceable ribbon which is fed past a thermal print head for transfer of ink to the mail items. Both the ink roller and the ink ribbon are removable from the postage meter by a user of the postage meter for replacement by a new ink roller or ink ribbon respectively. With both of these types of printer, the printer per se is maintained secure by the secure housing. In the case of the drum printer, mechanical elements for setting the printing elements of the printer are not accessible by a user of the postage meter and in the case of a thermal transfer printer, electrical connections to the print head for control and operation of the print head are protected from access thereto.

It is now proposed, instead of drum printers or thermal transfer printers, to use ink jet printing devices. Ink jet print heads are already used widely as computer output printers where security of operation thereof is neither a problem nor required. The ink jet print heads manufactured and sold for use in computer output printers comprise a module including a row of ink jet nozzles and means for ejecting selectively ink from those nozzles. The module also includes electronic circuits for operation of the ink ejection means and an ink supply to supply ink to the nozzles to replenish ink ejected from the nozzles in printing. When the ink in the ink supply is exhausted the entire module including the nozzles and electronic circuits is removed and replaced by a new ink jet print head module. It will be appreciated that the module is provided with electrical connections which, when the print head module is mounted in the postage meter, interface with similar connections of the postage meter.

SUMMARY OF THE INVENTION

According to the invention a postage meter includes a printing device removable by a user of the postage meter; electrical connection means interfacing with electrical contacts on the printing device when the printing device is mounted in the postage meter; said printing device including identification means storing a unique identification of the printing device; said postage meter including reading means to read the unique identification from the identification means and to determine from the unique identification whether the printing device is authorized for use in the postage meter and said postage meter being operable to print postage indicia only if the printing device is authorized for use in the postage meter.

BRIEF DESCRIPTION OF THE DRAWING

An embodiment of the invention will be described hereinafter by way of example with reference to the drawings in which.

DESCRIPTION OF THE PREFERRED EMBODIMENT

Figure 1:
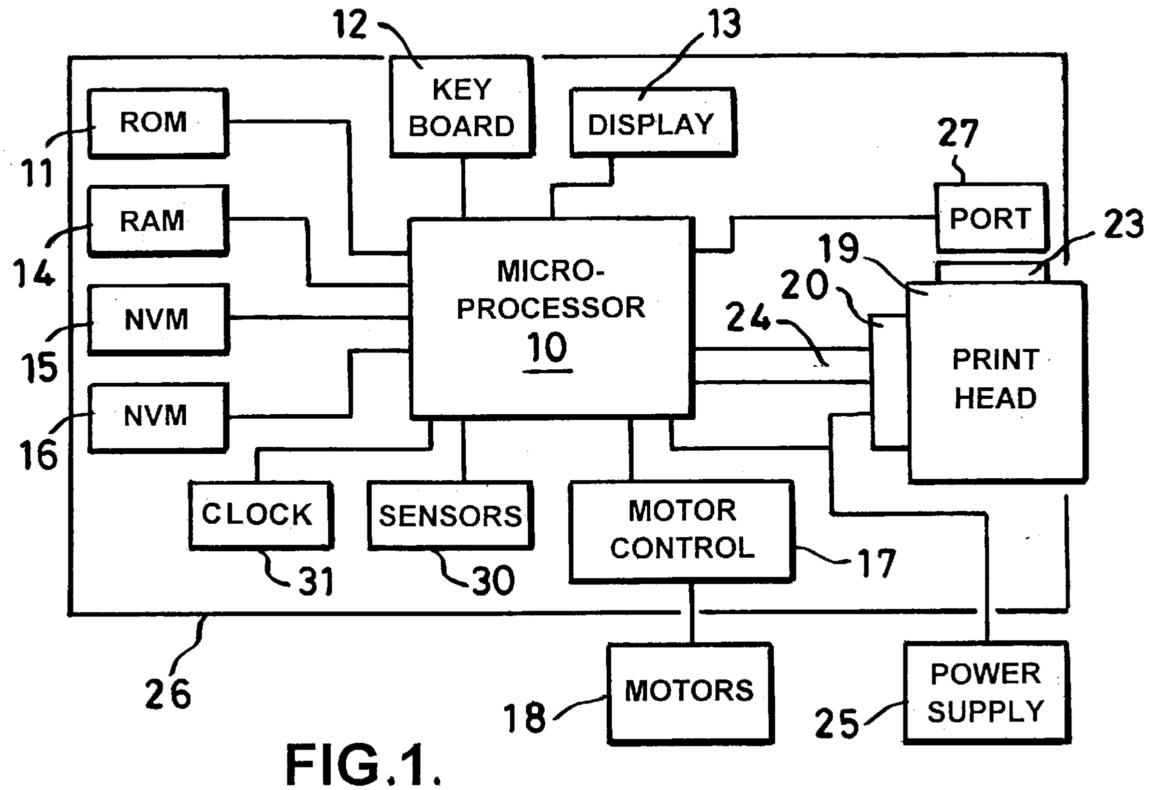
FIG. 1 is a block circuit diagram of a postage meter.

Referring first to FIG. 1 of the drawings, the postage meter includes electronic accounting and control means comprising a micro-processor 10 operating under program routines stored in a read only memory (ROM) 11. A keyboard 12 is provided for input of commands and data by a user and a display 13 is provided to enable display of information to the user. A random access memory (RAM) 14 is provided for use as a working store for storage of temporary data during operation of the postage meter.

Non-volatile duplicated memories 15, 16 are provided for the storage of critical data relating to use of the postage meter and which is required to be retained even when the postage meter is not powered. The microprocessor 10 carries out accounting functions in relation to use of the postage meter for franking mail items with amounts of postage charges applicable to handling of the mail items by the postal authority or another carrier. Accounting data relating to use of the postage meter for printing franking indicia representing postage charges for mail items and any other critical data to be retained is stored in the non-volatile memories 15, 16. The accounting data includes a value of credit, an accumulated total of value used by the meter in franking mail items, a count of the number of mail items franked by the meter and a count of the number of mail items franked with a postage charge in excess of a predetermined value. The value of credit may be a value of credit available for use by the meter and stored in a descending credit register. The accumulated total value used by the meter is stored in an ascending tote register, the count of items is stored in a piece count register and the count of items franked with a postage charge in excess of a predetermined value is stored in a large items register. Alternatively, if desired, instead of a descending register storing a value of credit available for use by the meter, a total value of credit entered into the meter may be stored in an ascending credit register.

As is well known in the postage meter art, each of the registers referred to hereinbefore for storing accounting data is replicated in order to enable integrity of the accounting data to be maintained even in the event of a fault or termination of power to the meter during a franking operation. Two replications of each of the registers are provided in each of the memory devices 15, 16.

Figure 2:
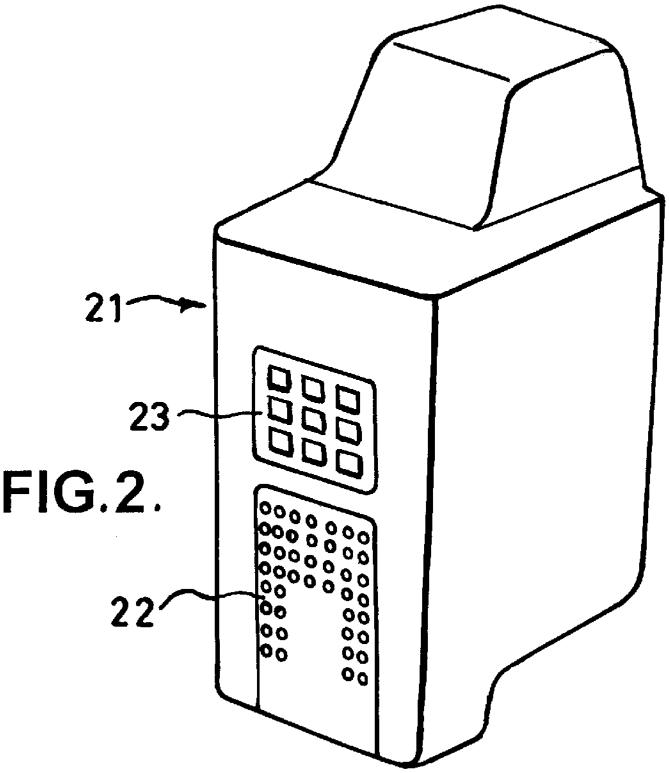
FIG. 2 illustrates a removable ink jet print head module.

A motor controller 17 is controlled by the microprocessor 10 to control operation of motors 18 driving feeding means (not shown) for feeding a mail item past a stationary digital print head 19 or for moving the digital print head in a translational movement relative to a print receiving area of a stationary mail item. The digital print head 19 is a removable print head connected to the postage meter by means of a connector 20. The digital print head is preferably an ink jet print head constructed as a module 21 as shown in FIG. 2. The module is provided with a plurality of electrically conductive pads 22 which interface with conductive elements of the connector 20 when the module 21 is mounted in the postage meter. The ink jet print head includes a plurality of ink ejection nozzles (not shown) from which ink may be ejected selectively by means of the operation of electronic circuits in the module. The module also contains a supply of ink to replenish ink ejected from the nozzles.

Sensors 30 are provided to sense and monitor feeding of the mail item, if the print head is stationary, or to sense and monitor motion of the print head, if the mail item is stationary. The sensors provide signals to the microprocessor to enable the microprocessor to control feeding of the mail item or motion of the print head and to output signals on bus 24 to selectively operate the circuits in the print head module to eject ink droplets from the nozzles at appropriate times as the mail item is fed past the nozzles of the print head.

Electrical power is supplied to the electronic circuits of the postage meter including the microprocessor, the print head module and the motor control from a power source 25.

It will be appreciated, as is well known in the postage meter art, that the postage meter must operate in a secure manner and be protected from attempts to use the meter fraudulently for example by utilizing the postage meter to print franking indicia on mail items for which no corresponding postage charge has been accounted for by the accounting means. Accordingly those parts of the postage meter required to be secured against unauthorized tampering are housed in a secure housing 26.

In so-called prepayment operation of a postage meter, each time a franking operation is to be performed, the microprocessor carries out a routine in which a determination is made as to whether the value of credit in the credit register in NVMs 15, 16 is sufficient to permit the franking operation in respect of the required postage charge for a mail item to be performed. If the value of credit in the credit register is sufficient, the franking operation is continued and the accounting data in the registers is updated to account for the postage charge and the franking indicia is printed. However if the value of credit in the credit register is not sufficient to permit the franking operation in respect of the required postage charge to be performed, the operation is terminated and the franking indicia is not printed. Where a value of credit available for use in franking is stored in a descending register, the check as to sufficiency of the credit available is effected by a determination of whether the postage charge is less than the credit value. Where a total value of credit is stored in an ascending credit register the check as to sufficiency of credit is effected by a determination of whether the total value of credit is at least equal to the sum of the postage amount and the accumulated total value in the tote register.

As described hereinbefore, the print head module 21 includes an ink supply. Accordingly when the ink supply is exhausted the module 21 must be removed and replaced by a new module containing a full ink supply. Removal of the used module and replacement by a new module needs to be effected by a user of the postage whenever the ink supply becomes exhausted. It is desirable that measures are taken to ensure that only authorized print head modules are mounted in the postage meter. Accordingly the print head module is provided with means uniquely identifying the print head module. Conveniently the means uniquely identifying the print head module may be a smart semiconductor device 23 secured to the module. The smart device 23 is so located on the module that, when the module is mounted operationally in the postage meter such that the contact pads 22 of the module interface with the connection elements of the connector 20, the smart device is in communication with a sensor port 27 connected to the microprocessor 10. In a postage indicium printing routine, the microprocessor reads data recorded in the smart device and, if the unique identity of the print head module read from the smart device is recognized by the microprocessor of the postage meter, the microprocessor continues with the postage indicium printing routine. If desired the unique identity read from the smart device may be included in the printed postage indicium or other information read from the smart device may be printed as a part of the postage indicium. The information stored in the smart device may include date of issue of the print head module, an expiration date after which the print head module is not to be used and the serial number of the postage meter in which the print head module is to be used. All or part of this information may be included in the postage indicium. In addition the postage meter may store in a register in the non-volatile memories 15, 16 a count of the number of postage indicia printed using the currently installed print head module. This count may also be included in the printed postage indicium. If desired and if the smart device can be written to by the microprocessor 10, the microprocessor may write the count of postage indicia to the smart device instead of or in addition to storing the count in the non-volatile memories 15, 16. The information may be stored in the smart device in encrypted form or the information may be stored in non-encrypted form but be encrypted by the microprocessor 10 prior to printing the information in the postage indicium.

The postage meter may include a real time clock 31 whereby the microprocessor may determine from date information read from the smart device 23 whether the current date is within a period in which the printing device is authorized to be used. If the current date is not within the period of authorized use of the print head, the microprocessor may inhibit further printing of postage indicia with the installed printing device thereby requiring the user to replace the printing device with a printing device having an acceptable date range.

As described hereinbefore, the microprocessor reads the unique identification information from the smart device during a postage printing routine. If desired the identification may be read in each postage printing routine or may be read at each power up of the postage meter. However if the identification is read only upon power up of the postage means it would be necessary to provide an indication to the microprocessor whenever a print head module is removed from and a print head module is installed in the postage meter and to cause the microprocessor to read the identification from the currently installed module prior to further printing of postage indicia.

To prevent removal of the smart device from the print head module with the intention of using the smart device in conjunction with an unauthorized print head module, the smart device may be formed on a relatively fragile substrate and secured to the module in such a manner that any attempt to interfere with or remove the smart device would result in destruction of the smart device.

The information, including the unique identity of the print head module, is recorded on the smart device prior to distribution of the print head module from a supply depot. The unique identity may include or comprise a unique identification applied to the postage meter with which the module is unauthorized to be used. The postage meter may utilize information read from the smart device to determine the number of postage indicia printed by the print head module and to inhibit printing utilizing that module when a predetermined number of indicia have been printed. Also the postage meter may utilize information read from the smart device to inhibit use of the module after a predetermined date.

The smart device 23 may be of a type having electrical connections in which case the port 26 includes electrical connections to interface with the connections of the smart device. Alternatively the smart device may be of a noncontact type in which case the port 26 is constructed to communicate with the smart device in a non-contact manner by electromagnetic radiation or the like appropriate to the smart device.

If desired access to the print head for removal and replacement thereof may be controlled in a secure manner, for example, as described in co-pending U.S. patent application Ser. No. 09/070,023 filed by Cyrus Abumehdi on the same date as the present application and claiming priority from GB patent application 9709051.8. The content of said co-pending U.S. patent application is hereby incorporated herein.

What is claimed is:

1. A postage meter including accounting means and a printing module;

said printing module being removable from said postage meter by a user of the postage meter;

electrical connection means for interfacing with electrical contacts on the printing module when the printing module is mounted in the postage meter;

said printing module including identification means storing unique identification information uniquely identifying said printing module;

said postage meter including reading means for reading the unique identification information from the identification means and for determining from the unique identification information if the printing module is a printing device authorized for use in the postage meter and said postage meter being operable to operate the printing module to print postage indicia only if the printing device is authorized for use in the postage meter.

2. A postage meter as claimed in claim 1 wherein the identification means includes a semiconductor device secured to the printing module and storing the unique identification information specific to said printing module.

3. A postage meter as claimed in claim 2 wherein the semiconductor device is relatively fragile and including means for securing said semiconductor device to the printing module and operative to ensure destruction of the semiconductor device in any attempt to remove the semiconductor device from the printing module.

4. A postage meter as claimed in claim 1 and including electronic control means, operative in a postage printing routine, for reading the unique identification information from the printing module, for checking that the unique identification information identifies a printing device authorized for use in the postage meter and for printing a postage indicium using said printing module only if the printing module is an authorized printing device.

5. A postage meter as claimed in claim 1 including electronic control means operative each time the printing module is installed in the postage meter to read the unique identification information from the printing module, to check that the unique identification information identifies an authorized printing device and to permit operation of the postage meter to print a postage indicium only if the printing module is an authorized printing device.

6. A postage meter as claimed in claim 5 wherein the electronic control means is operative while the printing module is installed in the postage meter to maintain a count of the number of postage indicia printed by the printing module.

7. A postage meter as claimed in claim 6 wherein the electronic means is operative to inhibit printing of postage indicia in response to the count reaching a predetermined number.

8. A postage meter as claimed in claim 7 wherein the printing device includes a memory and the count is stored in the memory.

9. A postage meter as claimed in claim 1 wherein the printing module includes an ink jet printer and an ink supply for the ink jet printer.

10. A postage meter as claimed in claim 1 wherein the postage meter includes a clock providing a real time date signal; the identification means includes a date determination relating to use of the printing module; and the postage meter is operable to print postage indicia only if a predetermined relationship exists between the date determination read from the identification means and the real time date signal.

11. A postage meter as claimed in claim 1 including electronic control means, operable to control the printing module, for printing a postage indicium on a mail item, said electronic control means being operative in response to information read from the identification means by the reading means to control the printing module to print at least a part of said information in the postage indicium.

* * * * *